(12) United States Patent
Breda (10) Patent No.: US 6,196,266 B1
(45) Date of Patent: Mar. 6, 2001

(54) MULTIPORT DIVERTER VALVE

(75) Inventor: Silvano Breda, 37 Deanbank Drive, Thornhill, Ontario (CA), M3J 2R1

(73) Assignee: Silvano Breda, Downsview (CA)

( * ) Notice: Subject to any disclaimer, the term of this patent is extended or adjusted under 35 U.S.C. 154(b) by 0 days.

(21) Appl. No.: 09/195,677

(22) Filed: Nov. 19, 1998

Related U.S. Application Data (63) Continuation-in-part of application No. 09/008,549, filed on Jan. 16, 1998, now abandoned.

(51) Int. Cl.⁷ .................................................... F16K 11/00
(52) U.S. Cl. ............................. 137/625.11; 137/625.23; 137/625.47; 137/454.6; 251/288
(58) Field of Search ........................ 137/625.11, 625.47, 137/454.6, 454.2, 625.23, 625.22; 251/297, 288

(56) References Cited

U.S. PATENT DOCUMENTS

| | | | |
|---|---|---|---|
| 2,492,140 | * 12/1949 | Fike et al. ................... | 137/625.11 X |
| 2,492,151 | * 12/1949 | Holm et al. ...................... | 137/625.11 |
| 2,830,564 | * 4/1958 | Bryant ............................. | 137/625.11 |
| 2,906,293 | * 9/1959 | Fraser et al. ................ | 137/625.47 X |
| 2,979,082 | * 4/1961 | Neves ............................. | 137/625.11 |
| 3,424,184 | * 1/1969 | Brimley et al. ............. | 137/625.22 X |
| 3,443,592 | * 5/1969 | Felmlee ........................... | 137/625.11 |
| 3,543,796 | * 12/1970 | Durant ......................... | 137/625.11 X |
| 3,570,537 | * 3/1971 | Kelly .............................. | 137/454.2 X |
| 3,687,163 | * 8/1972 | Nickels ........................... | 137/625.11 |
| 4,109,670 | * 8/1978 | Slagel ............................. | 137/119.03 |
| 4,441,524 | * 4/1984 | Mese .............................. | 137/625.47 |
| 4,589,441 | * 5/1986 | Campau ............................. | 137/512 |
| 4,628,962 | * 12/1986 | Pezzarossi ....................... | 137/625.47 |
| 4,700,736 | * 10/1987 | Sheen .............................. | 137/315 |
| 4,948,095 | * 8/1990 | Campau .......................... | 251/304 X |
| 4,968,334 | * 11/1990 | Hilton .................................. | 96/124 |
| 5,685,330 | * 11/1997 | Breda ............................... | 137/218 |
| 5,819,798 | * 10/1998 | Claflin et al. ................. | 137/625.11 |
| 5,871,032 | * 2/1999 | Ko ................................. | 137/625.47 |
| 5,901,735 | * 5/1999 | Breda ............................... | 137/218 |

* cited by examiner

Primary Examiner—John Rivell
Assistant Examiner—Meredith H. Schoenfeld
(74) Attorney, Agent, or Firm—Neil H. Hughes; Ivor M. Hughes; Marcelo K. Sarkis (57) ABSTRACT

A compact diverting valve having a plurality of output ports for supplying various previously mixed hot water and cold water to anyone of a number of output ports. In some instances more than one output port may be supplied with previously mixed hot and cold water at a particular setting of the device. The system also includes a positive keying system into the diverter valve so that the valve actuator, manipulated by the user, has only one possible "rest" position for each selected output mode position. The valve also includes limit stops to prevent complete rotations of the valve actuator by the user an single spring C clips to facilitate removal of the component parts of the valve.

10 Claims, 8 Drawing Sheets

MULTIPORT DIVERTER VALVE

This application is a Continuation-In-Part of U.S. application Ser. No. 09/008,549 filed Jan. 16, 1998 now abandoned.

Most of present day residences have a combined tub-shower installation which includes a simple diverting device incorporated into the bathtub spout which either allows the water to freely exit to the tub through the spout or to be diverted to an overhead showering device. The diverting device is simple and inexpensive and is subject to wear. It is designed to be manually moved from its "unblocking" position in the tub spout to a "blocking" position by the user to divert water which would normally exit through the spout to the overhead showering device.

In some tub-shower installations, a diverter valving system is built into the hot and cold mixing valve device in such a manner that the user may swing a lever protruding from an escutcheon plate to direct the previously mixed hot and cold water from the spout to the overhead showering device.

In some instances a "pushbutton" is used in place of the lever device to control the exit of the previously mixed hot and cold water to either tub or shower.

All the above diverting devices are subject to wear and tear with the result being that the diverter incorporated into the tub spout is prone to leakage which results in a substantial proportion of the previously mixed water exiting past the diverter device and into the tub when the user wishes to have all the available water delivered to the overhead showering device.

The diverting devices which are built into the hot and cold water mixing devices tend to leak after prolonged used, and because these diverting devices are built into the mixing device, any malfunction of the diverting valve device which requires repair may require a further opening of the wall surrounding the escutcheon plate to gain sufficient access to the mixing device (which incorporates the diverter valve). Even with the increased access to the combined unit, the repairs to the mixing device diverter valve may require special tools to dissemble the device, and if substantial leakage has occurred before a timely repair procedure has been adopted, corrosion may make disassembly almost impossible. Repair and replacement of worn or corroded parts may consume inordinate amounts of maintenance time making such repairs very costly.

SUMMARY OF THE INVENTION

It is a primary object of this invention to provide a compact diverting valve having a plurality of output ports for supplying previously mixed hot and cold water to anyone of a number of output ports. Such output ports may be connected by appropriate plumbing to a variety of washing or showering devices which may be activated by manually moving a single control. In some instances more than one outlet port may be supplied with previously mixed hot and cold water at a particular setting of the device. It is a further object of this device to provide a full flow throughput of the mixed water supplied by the valve of this invention to the selected washing or showering device no matter which selected output mode is chosen by the user. This is made possible by incorporating a positive keying system into the diverter valve so that the valve actuator, which is manipulated by the user, has only one possible "rest" position for each selected output mode position. This assures the exact alignment of the various internal valve components to prevent any undue throttling of the water stream passing through the diverter valve.

The diverter valve is also arranged to have a porting arrangement wherein the channels through which the water passes, in the interior of the diverter valve, are arranged to be of a size which is comparable to the plumbing conduits connected to the valve itself.

It is a further object of this invention to provide a diverter valve in which the component parts of the valve are entirely accessible to maintenance personnel by the simple removal of an escutcheon plate. Removal of the complete valving components is facilitated by removal of a single spring C clip.

It is a further object to incorporate "limit" stops into the diverter valve housing to prevent the complete rotations of the valve actuator by the user.

It is another object of this invention to provide interchangeable grommets having various orifices which may be easily installed in components of the diverter valve to control the output flow to the washing appliance being supplied by the valve at that particular selected valve position.

These and other objects are made possible by incorporating a pair of mating cylindrically shaped valve components in a housing which itself has a cylindrical surface to mate with one of the pair of the valve components above.

An inner valve component of the above pair (stem) rotates within the outer component of the pair (stationary port member) to align or block ports in the pair of components. The outer component of the pair is securely fastened in the interior of the valve housing so that it remains stationary and its outer cylindrical surface is in close proximity with the cylindrical surface of the housing, and any outlet ports in the housing. The outer component of the pair is restrained to be perfectly installed in the housing and is sealed against leakage within the housing by sealing grommets incorporated into ports of the outer component which seal against the valve housing.

The outer surface of the rotating inner component (stem) of the cylindrically shaped valve components is in close proximity with the inner surface of the outer valve component of the pair and one or more ports which may be incorporated into the inner component align with the various grommeted ports of the outer component at selected rotational positions of the inner component. The grommets in the ports of the outer component also provide a seal with the exterior surface of the inner rotating component.

The rotatable inner component is secured to a spindle which protrudes through the housing and controls the rotation of the inner component. The valve spindle is arranged to be connected into a "keying" assembly common to both the spindle and housing to assure that the spindle stops only at a predetermined mode position as determined by the "keying" assembly to assure that the ports of the inner and outer cylindrical components are perfectly aligned for that particular mode.

A limit stop mechanism is also incorporated into the spindle and housing to provide rotational limits for rotation of the spindle within the diverter valve housing. The valve of this invention also has a "bleed" system incorporated in its structure which enables an overhead shower standpipe to empty into the spout during periods where the diverter valve is set to deliver water to the spout. This prevents the user from being subjected to an initial blast of cold water which was previously captured and held in the shower standpipe from the prior use of the overhead shower.

DETAILED DESCRIPTION OF THE DRAWINGS

Figure 1:
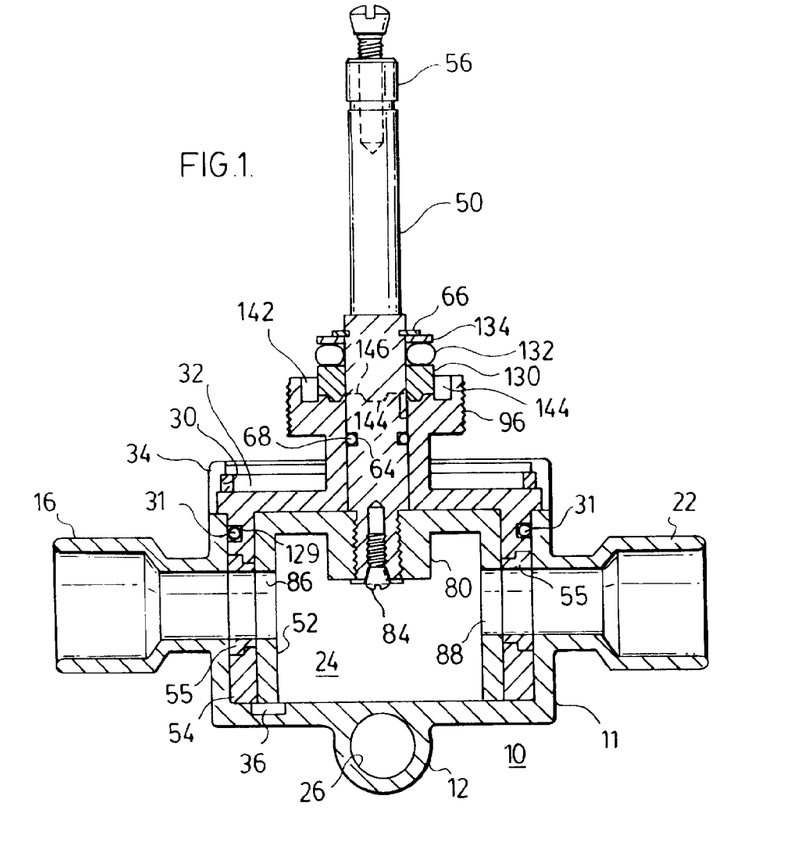
FIG. 1 is a partial cross-sectional view of an elevational drawing of this invention.
Figure 2:
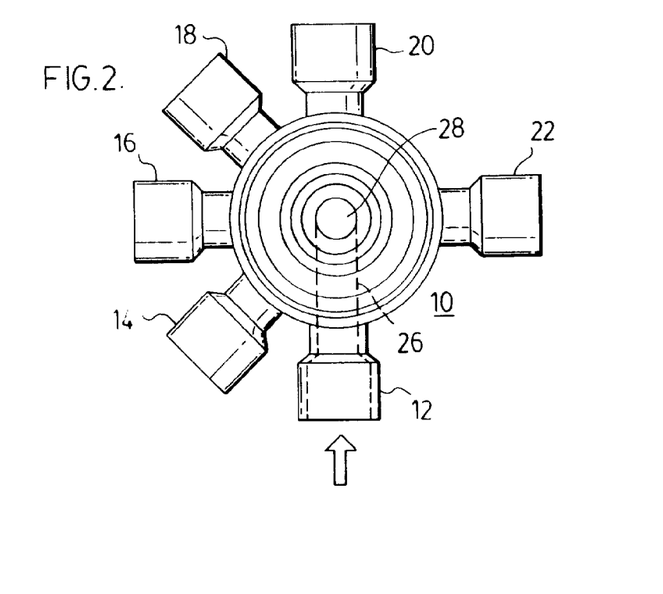
FIG. 2 is a plan view of the same valve.

Referring now to the drawings and FIG. 1 in particular, a diverter valve 10 of applicant's invention is shown partially in section. A valve body 11 composed of copper, brass, white metal, or other suitable material is shown having an inlet 12 and outlets 14, 16, 18, 20, and 22 (see FIG. 2) of which outlets 14 and 22 are shown in FIG. 1.

Body 11 comprises a cylinder, closed at one end, having an interior body cavity 24 in which the closed end of the cylinder (bottom) contains a water inlet passage 26 which opens into the cavity 24 at orifice 28.

The body 10 is provided with a groove 30 located near the top of cavity 24 for receipt of spring clip 32 which will hold the various valve components to be described securely in cavity 24.

Body 11 is provided with a vertically extending slot 34 at the top of cavity 24, which will be used to assure the proper orientation of the installed components of valve 10 which are to be assembled into the cavity 24.

Body 11 is also provided with a cylindraceous recess 36 the bottom of cavity 24 for reasons which will become apparent later.

The physical constraints on the body 11 are such that the body 11 must be able to withstand water pressures of up to 70 psi without leaking or undergoing undue distortion.

The interior cylindrical surface of the cavity 24 of body 11 must be smooth so as to be able to safely receive the interior components of the valve 10 which must be installed in cavity 24 without damage and thus be able to form a sealing engagement with the cylindrical surface 24 during the working life of valve 10.

Figures 3, 4, 5, 6:
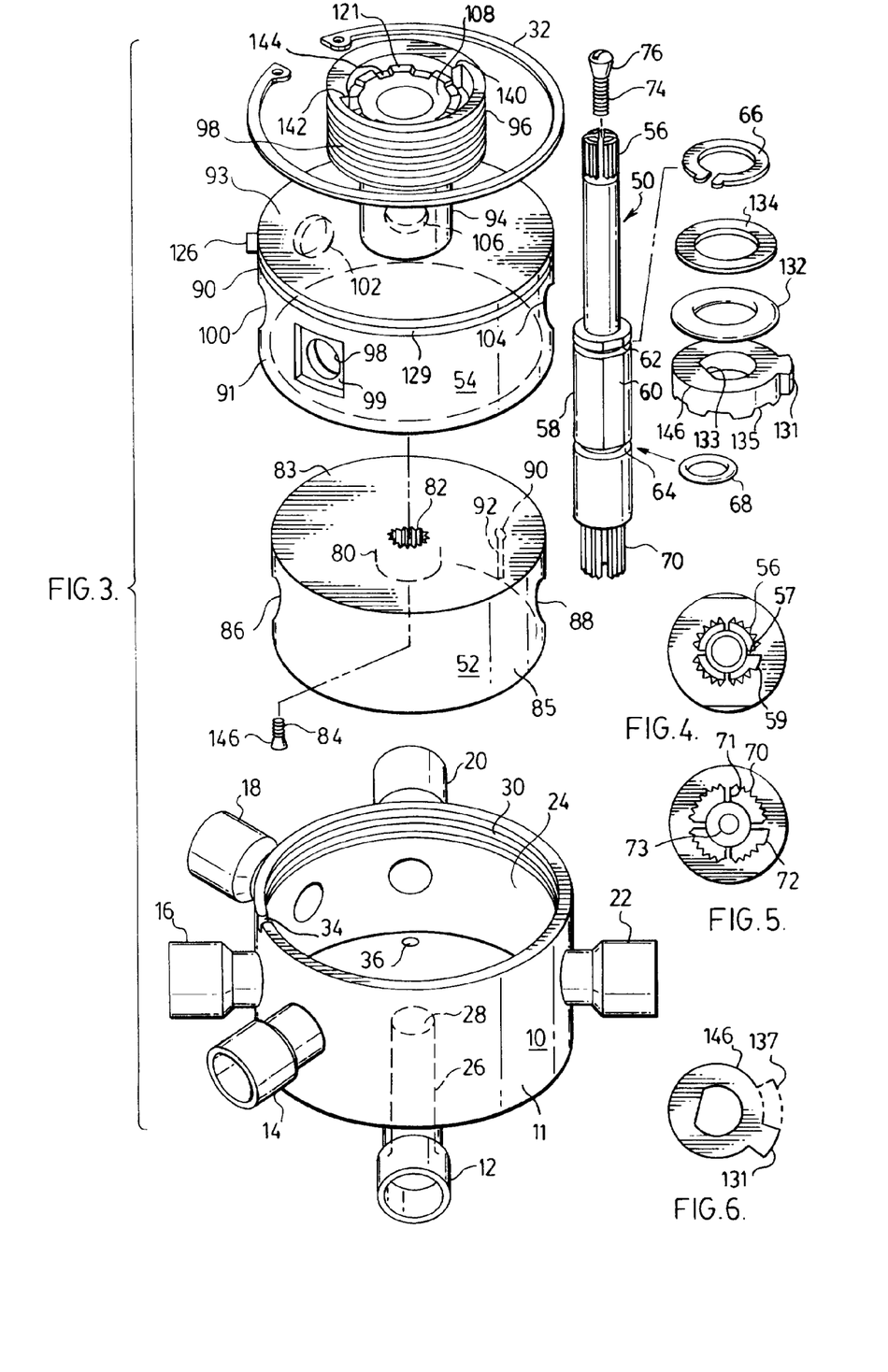
FIG. 3 is a perspective exploded view of the same valve.
FIG. 4 is an enlarged plan view of the top of the spindle shown in FIG. 3.
FIG. 5 is a bottom plan view of the lower end of the spindle of FIG. 3.
FIG. 6 is a view of the spindle stop component of FIG. 3.

The interior components which are to be assembled together to form a working unit or "kit" are: spindle 50; rotating stem 52; and stationary port member 54. When assembled, these units are installed as a "kit" into cavity 24 of body 11.

Spindle 50 is an elongated cylindrical member having a segmented splined top end 56 for receipt of an operating handle or lever (not shown) and a segmented splined lower end 70 for receiving and locking stem member 52 thereon. Spindle 50 has an enlarged cylindrical portion 58 which is provided with a facet 60 which is provided on spindle 50 to insure proper installation having regard to indexing of the various components which will subsequently be mounted on spindle 50.

The two remote ends 56 and 70 of spindle 50 are provided with splines which are segmented by slots 57 and 71 respectively, so that when a threaded screw such as 84 is threaded into threaded bore 73 of splined end 70, the tapered shoulder 146 of screw 84 causes the four segments of the splined end 70 to expand and lock the installed stem 52 thereon.

Spindle 50 also has a pair of spaced circumferential grooves 62 and 64 extending around the surface of the enlarged portion 58. Groove 52 is provided for receiving C shaped spring clip 66 and groove 64 is provided for reception of rubber or neoprene O ring 68.

The splined ends 50 and 70 of spindle 50 each have indexing portions 59 and 72 which prevent any improper mating of splined components which may subsequently be mounted to the ends of spindle 50. In this instance, indexing portions 59 and 72 are formed by the omission of one groove in that particular portion of the spline. Other methods of indexing (i.e. keyways, etc.) are possible.

Rotatable stem 52 is mounted on the splined end 70 of spindle 50. Stem 52 is preferably of high impact plastic material and has the general shape of a closed cylinder, comprising a circularly shaped top wall 83 and an integrally attached cylindrical wall 85. Top wall 83 contains a boss 80 in which a spline 82 is formed which matches spline 70 of spindle 50 including a special groove (not shown) to receive indexing portion 72. Cylindrical wall 85 is provided (in this instance) with two ports 86 and 88.

Wall 85 is also provided with a recess 90 which is formed into V shaped trough 92 which extends to the lower surface of wall 85.

A stationary ported insert member 54 having the shape of a closed cylinder is provided to be installed in cavity 24 of body 11. Insert 54 is composed of a high impact plastic material which has sufficient strength to withstand water pressures up to 70 psi without undergoing undue distortion. Insert 54 is provided with a cylindrical wall 91 which is integrally moulded with the top circular wall 93. Circular wall 92 is integrally connected to neck 94 which develops into enlarged boss 96.

Wall 91 of inset 54 is provided (in this instance) with a series of ports 98, 100, 102, 104, and 106 which in the final assembly of insert 54 into cavity 24 of body 11, ports 98–106, are in exact alignment with outlet ports 14–22 of body 11.

Ports 98–106 (shown in enlarged detail in FIG. 9) extend completely through wall 91 and are faced on the exterior surface with somewhat square shaped recess 120 surrounds each port in the surface of insert 54.

Figure 7:
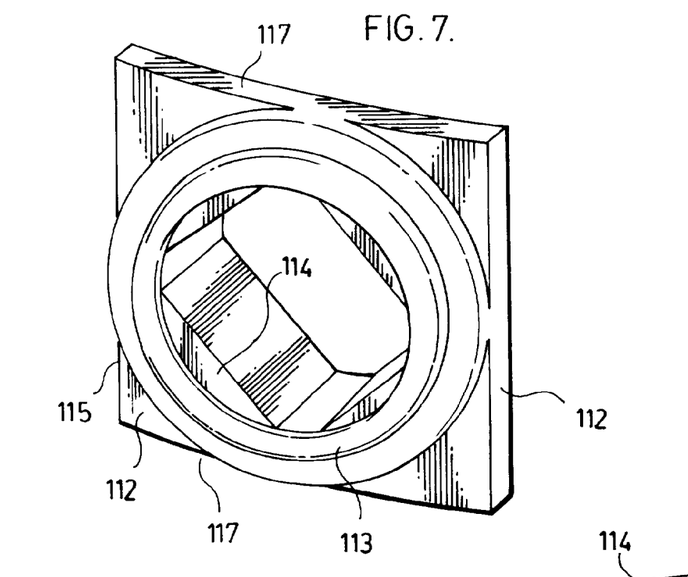
FIG. 7 is an enlarged view of the grommet-port assembly of the diverter valve.
Figure 8:
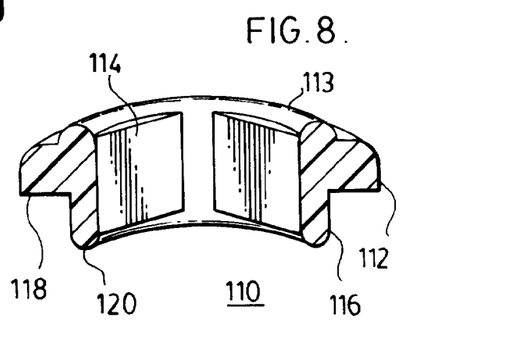
FIG. 8 is a sectional view of the grommet of FIG. 7.

Ports 98–106 are specifically shaped to receive grommets 110 (see FIG. 7). Grommets 110 have a square surround surface 117 bounded by sides 112 and 115 and a cylindrical projection 116 which is of such shape and size as to functionally engage ports 98–106 and pass completely there through and the square outer surface 117 of grommet 110 fits flush into recesses 120 in the wall 91 surrounding each port. Each grommet 110 is inserted into one of the ports 98–106 so that the cylindrical projection 116 passes entirely through wall 91 until shoulder 118 is engaged by the outer surface of wall 91. The orifice 114 inside the cylindrically shaped projection 116 is somewhat of a square configuration.

The enlarged boss 96 of insert member 54 is provided with a keying surface 121 which is provided with a series of detents such as 144 which are functionally related in number and position on the housing to the number of outlets on the body 11. Detents such as 144 are present to provide an exact setting of the spindle 50 and its associated stem 52 for each selected mode position of the operating handle or lever (not shown).

Beside providing the detent surface 121, the boss provides a pair of shoulders 140 and 142 which define the limits of rotational travel of the spindle 50.

Insert member 54 is also provided with a projecting tab 126 which will key into slot 34 of the body 11 to assure proper orientation of the insert 54 in body 11 so that ports 98–106 on insert 54 are in perfect alignment with outlets 14–22 in body 11.

A cylindrical groove 129 near the top of the outside surface 91 of insert 54 is provided to receive an O ring 31, to provide the necessary water seal between insert 54 and body 11.

The enlarged portion 58 of spindle 50 bearing facet 60 is provided with a keying assembly which is used to assure that the spindle 50—stem 52 combination will only come to rest at predetermined rotational position at each mode settings. To perform this function, portion 58 is fitted with a keying-stop member 146, O ring 132, metal washer 134 and spring clip 66 when the assembly of the valve components is undertaken.

The initial assembly of the valve is as follows:

The spindle 50 is attached to stem 52 by inserting the spline 70 into the splined bore 82 of stem 52. Stem 70 will only fit in one predetermined position because of the indexing portion 72 on spline 70 and the complimentary groove (not shown) in splined bore 82. Thus when the stem 52 is mounted on spindle 50, a certain predetermined positional relationship exists between the location of ports 86 and 88 on stem 52 and the location of facet 60 on the spindle 50.

The spindle 50 is now locked in place in stem 52 by screw 84. The segments of the splined end 70 of spindle 50 are expanded by the advancement of tapered shoulder 146 in bore 73 of spindle 50 to firmly lock spindle spline 70 to bore 82.

At this time, O ring 68 is installed in groove 64 of spindle 50, and the spindle-stem assembled unit 50–52 is ready to be installed in insert member 54. Spindle 50 is inserted into bore 108 of insert member 54 from below until the top 83 of stem engages the lower surface of top wall 93 of insert 54.

At this time, the keying assembly is installed on enlarged surface 58 of spindle 50. Keying-stop member 146 is placed on spindle 50 first so that flat 133 engages facet 60 of the spindle and the detents 144 in surface 121 of boss 96 engage the ribs between detents 135 of keying-stop member 146.

O ring 132 is next installed on spindle enlargement 58 so as to engage the top surface of keying-stop member 146.

Metal washer 134 is installed on spindle enlargement 58 so as to engage the top surface of O ring 132. Next, the washer 134 is depressed to compress O ring 132 and the spring clip 66 is installed in groove 62 of the spindle enlargement 58. At this time the spindle-stem unit 50–52 unit may be rotated within limits as defined by tab 131 on keying stop member 146 and the cooperating shoulders 140 and 142 on boss 96. The detents 144 and boss 96 and the ribs between detents 135 of member 146 are not resiliently pressed together by O ring 132 to provide predetermined stop positions of stem 52 at each mode position. This assures perfect alignment of port(s) 86 and 99 on stem 52 with port(s) 98–106 on insert 54.

At this time, O ring 68 provides a watertight seal in bore 108 of boss 96 of insert member 54, and insert 54 is ready for preparation for insertion into cavity 24 of body 11 of the valve 10.

Figure 9:
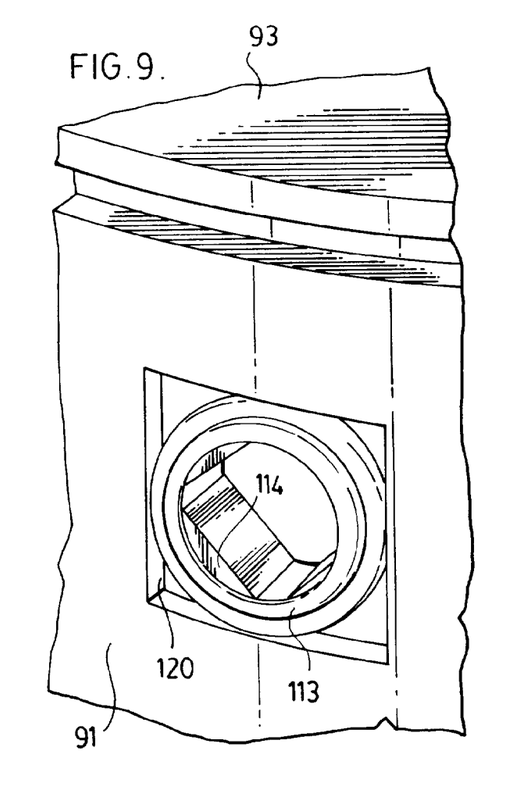
FIG. 9 is a partial enlarged view of the grommet-port assembly.

Grommets 110 are inserted into ports 98–106 so that cylindrical projections 116 pass completely through wall 91 of insert 54 and shoulder 118 rests against the exterior surface of recess 120 in wall 91. At this time, surface 120 of grommet 110 engages the outer surface of wall 85 of stem 52.

An O ring 31 is installed in groove 129 of insert 54, and the assembly (kit includes spindle 50, stem 52, and insert 54) may now be installed as a single entity in cavity 24 of body 11. Caution may be exercised in order to assure that projection 126 of insert 54 is perfectly lined up with slot 34 of body 11; when it does, the assembly 52, 54 may be pushed to a "home" position in cavity 24 and a spring clip 32 is installed in groove 30 of body 10 to lock the assembly 50, 52, 54 in place.

When the assembly 50, 52, 54 is locked in place by spring clip 32, the recess 36 in the lower surface of cavity 24 will "overlap" the surfaces of wall 85 of member 52 as shown in FIG. 1. Recess 36 is usually located in body 10 adjacent to an output port which feeds an overhead shower.

The stem 52 is made in such a manner that depression 90 and V shaped trough 92 are facing the outlet port in insert 54 which feeds an overhead showering appliance when the stem is set in the "spout" mode. This means that the valve is in a mode to deliver any water supplied to it, to the spout.

Any water trapped in the upstanding plumbing pipes from previous use will be permitted to drain into the port which usually is connected to the overhead shower and into V shaped groove 92 and into recess 36 and into cavity 24 and to the spout, allowing the trapped column of water in the shower pipe to drain into the spout.

The assembly now is complete with the exception of the installation of an actuating handle or lever on spline 56 of the protruding spindle 50. Spindle 50 is provided with a specially shaped splined end 56 which preferably includes another indexing portion 59 which performs the same function as indexing portion 72 on the lower spline 70 of spindle 50. The splined end 56 is divided into segments by slots such as 57 to allow the splined end 56 to function as an expanding mandrel.

When the assembly is complete, the valve 10 will allow spindle rotation through an arc which is determined by stop 131 on keying-stop member 146 (in this instance about 135°), and each mode position of spindle 50 and its associated stem 52 is determined by the cooperating detents 135 on keying-stop member 146 and detents 144 in surface 121 of boss 96 of insert 54. The positioning of stem 52 in insert 54 as provided by the keying-stop member 146 and the surface 121 of boss 96 assures that the ports in stem 52 (86 and 88) are in perfect alignment with the ports in insert 54 (98–106) at each mode setting. This feature assures full flow of liquid through valve 10 at any of the mode settings.

If fewer mode settings are made necessary because of a decreased number of outlets being utilized on valve 10, the keying-stop member may be tailored to the valve application by changing the shape of tab 131 as shown in FIG. 6 where the stop 131 is increased in width as shown at 137. This would decrease the arc of rotation available for spindle 50 and the number of outlets in body 11 serviced by stem 52 will be correspondingly reduced.

Stem 52 is shown having two ports 86 and 88. In some instances, it may be necessary to have only one port in stem 52 and at other times it may be convenient to have more than two ports for delivery of larger quantities of water to the washing or showering appliances.

At the same time, it is possible to increase the number of ports and outlets serviced by the valve 10 by increasing the number of ports in insert 54 and of course the outlets of valve 10 to correspond to the increased number of ports.

The grommets 110 may be made to have a variation in the size of the orifices, such as 114, to throttle the water passing through the grommet so that washing or showering appliances requiring reduced flow of water may be serviced by a port having reduced flow capacity.

The keying-stop mechanism (combination of member 146 and surface 141 of boss 96) functions to assure that stem 52 always locates itself in a stopped position at any mode setting so that the port(s) in member 52 are in perfect alignment with the port(s) in insert member 54. This is caused by the spring loading of keying-stop member 146 in a direction to press the complimentary detents of member 146 and boss 96 together. The detent surfaces are slightly ramped so that the keying-stop member 146 will always attempt to reach a position where the mating surfaces on boss 96 and keying-stop member are perfectly interdigitized. Those skilled in the art will immediately recognize that for this application two surfaces having ramped surfaces having detents with sloping sides have been described, other variations are possible such as a bulldog (spring loaded ball engaging a ridges surface) will function successfully. The advantage of applicant's system lies in the plurality of detents being engaged at each stop (8) and the incidence of wear of the detent surfaces is substantially reduced. The spring pressure applied to member 146 to achieve the desired keying of mode positions of spindle 50 is thus substantially reduced over other obvious keying systems.

Figure 10:
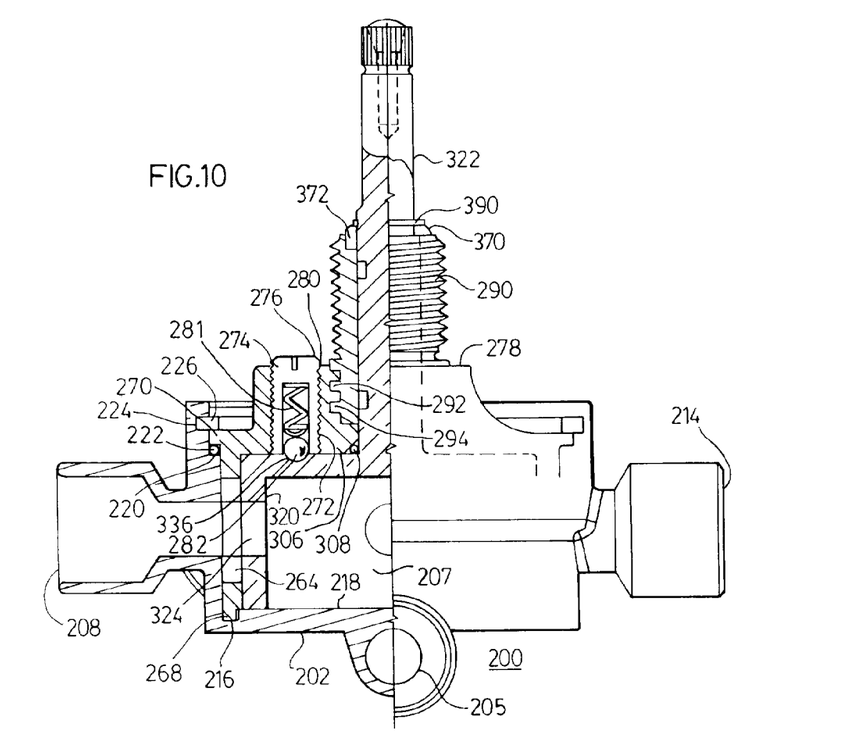
FIG. 10 is a partial sectional view of a valve which is a variation of the valve of FIG. 1.

FIG. 10 shows valve 200 which is a variation of the previously described valve 10. Valve 200 has a body 202 which may be of a similar material to the body 11 of valve 10. Body 202 is quite similar in shape to body 11, having an inlet at 204 (and inlet passageway 205) and the various outlets 206, 208, 210, 212 and 216. Body 202 has an interior cavity 207 which is in communication with inlet passageway 205.

Body 202 is provided with a cylindraceous recess 216 in the lower interior surface 218 of body 202. The recess 216 is immediately adjacent to the location of outlet 208.

Body 202 is also provided with an annular shaped groove 220 to receive O ring 222 therein. As with the previously described valve 10, body 202 has an annular groove 224 formed therein (just above groove 220) to receive a locking spring clip 226.

Figure 12:
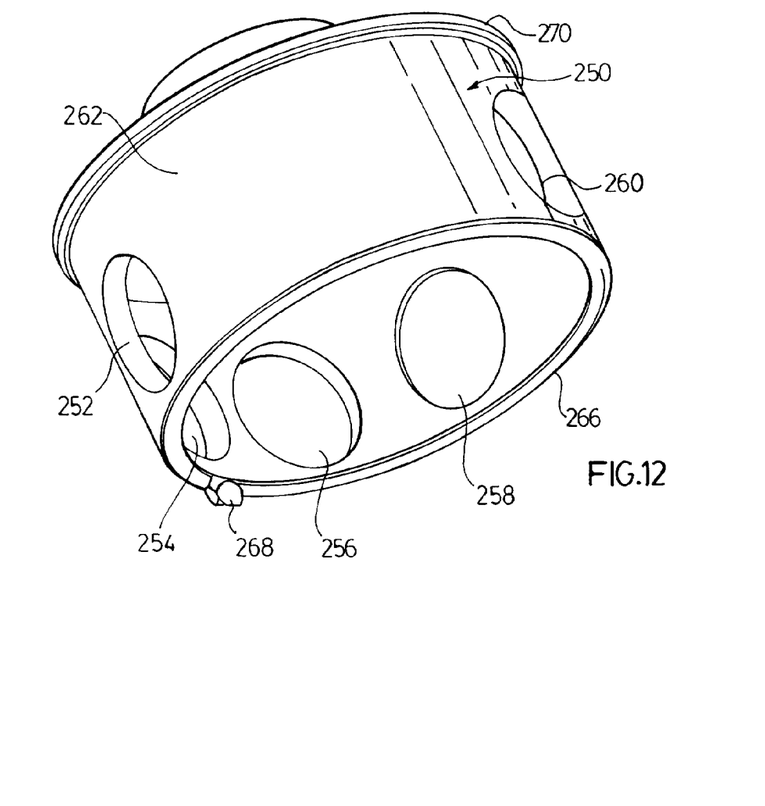
FIG. 12 is a perspective view of the stationary port member of the valve of this invention.
Figure 13:
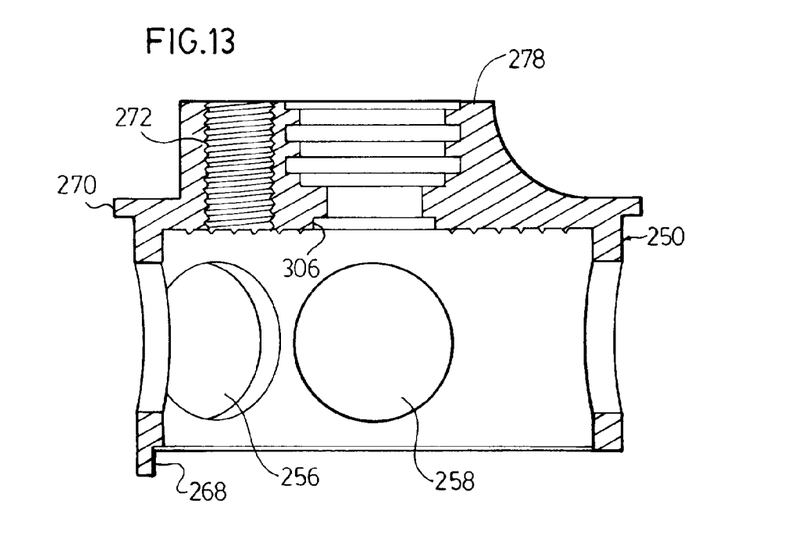
FIG. 13 is a sectional view of the stationary port member of this invention.

A stationary port member 250 (which has a similar function to previously described member 54) is received within the body 202 (see FIGS. 12 and 13). Stationary port member 250 is of the shape of a hollow cylinder and is provided with a series of ports 252–260 which are located in the cylindraceous sidewall 262 opposite each of the outlets 206–214 of body 200. Grommets such as 264 are located in each of the ports 252–260 of stationary port member 250.

The lower surface 266 of member 250 is annular in shape to mate with surface 218 of body 202. The lower surface 266 is provided with a projecting tang 268 (in this instance of cylindraceous shape) to be received in recess 216. This feature assures the proper orientation of the stationary port member 250 within body 202, so that the ports 252–260 are in exact alignment with outlets 206–214 of body 202.

Stationary port member 250 is provided with an annular lip 270 which captures and presses the O ring 222 in groove 224 of body 202 to seal the stationary port member 250 in the body 202.

Stationary port member 250 is held downwardly in place in body 202 by means of a spring clip 22 which bears down against the upper surface of projecting lip 270. This action compresses seal 220 and assures that tang 268 is firmly locked in recess 216.

Stationary port member 250 is provided with a threaded bore 272 in the top thereof. Bore 272 is fitted with hollow plug 274 which is threaded into bore 272 until its head 276 engages the top surface 278 of stationary port member 250.

Hollow plug 274 contains a spring 281 which preloads ball 282 in a downward direction.

A hollow metallic boss 290 (FIG. 18) is located at the center of the top surface 278 of stationary port member 250. This boss is "cast in place" and is an integral part of stationary port member 250 and features ribs 292, 294 to provide superior bonding and support for boss 290 in stationary port member 250 over the life of valve 200.

Figure 18:
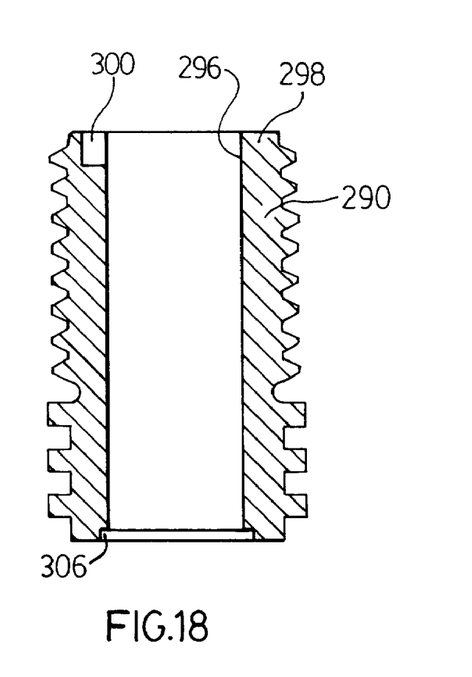
FIG. 18 is a sectional elevation of the boss which is part of the stationary port member of FIGS. 12 and 13.
Figure 19:
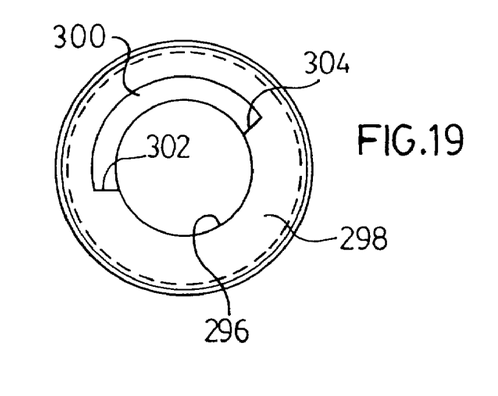
FIG. 19 is a top view of the boss of FIG. 18.

Boss 290 is provided with a central bore 296 which is concentric with the lower cylindrical base portion of stationary port member 250. The top surface 298 of boss 290 is of an annular shape and has a recess 300 which extends around bore 296 (about 130°). Recess 300 is provided with a pair of abutments 302 and 304 at each end of the recess.

Beneath the boss 290, the stationary port member 250 is provided with a cylindraceous recess 306 for receiving sealing ring 308.

As with member 54, the member 250 fits into body 202 in a sliding fit so that each of the grommets 264 seal at the interface between stationary port member 250 and body 202.

A rotating diverting sleeve 320 (FIGS. 14, 15 and 16) is integrally attached to spindle 322. Spindle 322 may comprise brass or some other suitable metallic substance; cylindrical body 320 is preferably a high impact plastic material.

Figure 14:
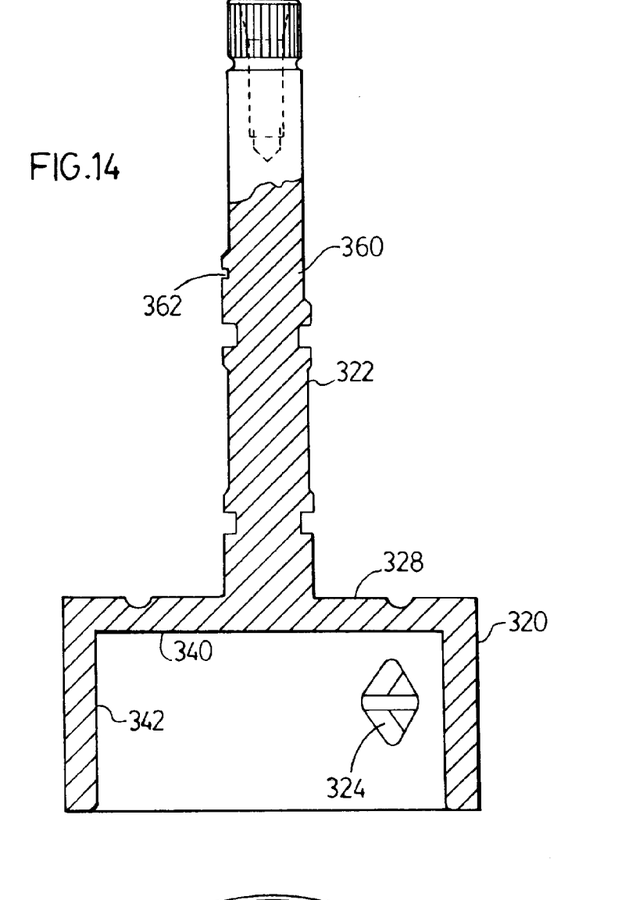
FIG. 14 shows the rotatable sleeve diverter of this invention.
Figure 15:
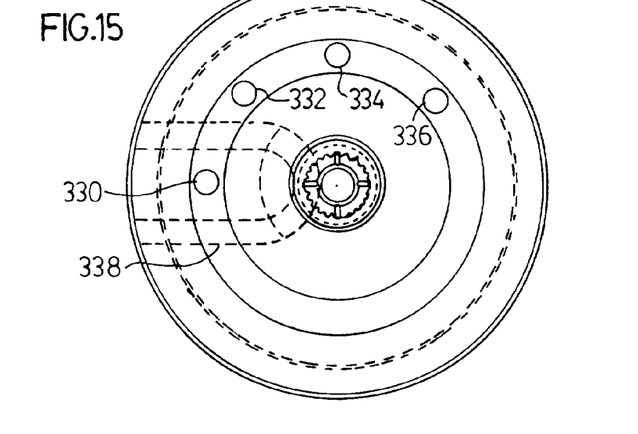
FIG. 15 shows a plan sectional view of the diverter of FIG. 14.

Body 320 is similar to body 52 of the previous example, having a pair of opposing ports 324 and 326 on sleeve 320. As with the previous valve, the diverter sleeve rotates within the stationary port member 250 to expose the ports 206–214 during rotation.

Figure 16:
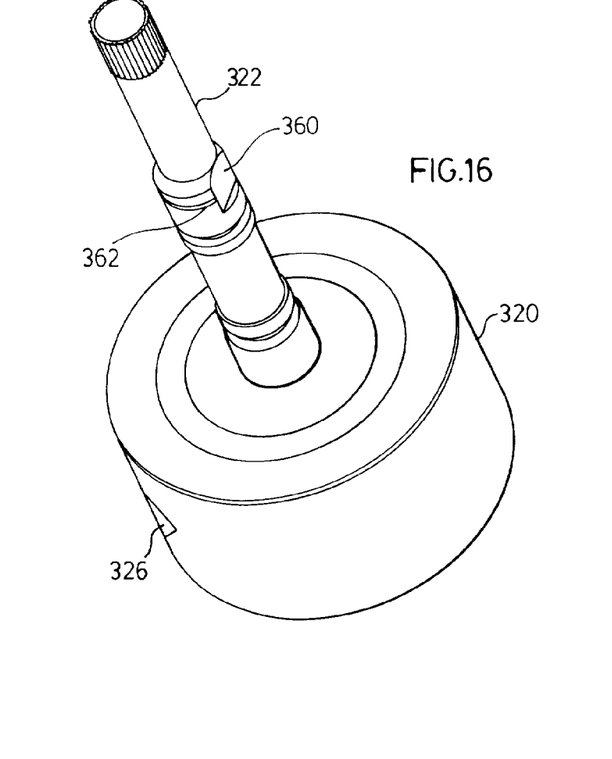
FIG. 16 is a top view of the diverter sleeve.

The top surface 328 of rotating sleeve 320 is provided with four spherical dimpled depressions 330–336 circumferentially spaced at predetermined locations and at a common radius. The depressions 330–336 are located so as to be intercepted by ball 282 of stationary sleeve member 250 which is spring loaded downwardly to provide stops for the diverting sleeve 320 as it moves from one operating position to the next one.

Figure 17:
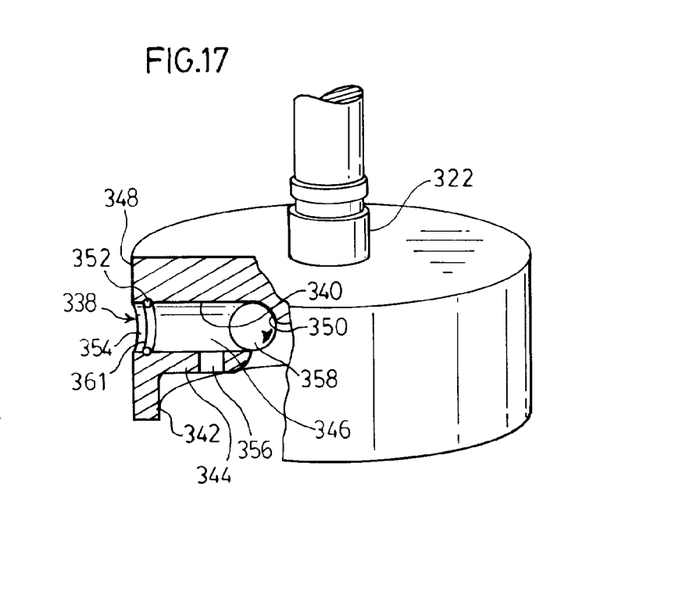
FIG. 17 is a sectional view showing the ball and groove mechanism of the invention.

In the interior of diverting sleeve 320, an integrally formed shower drain assembly 338 is formed into surfaces 340 and 342 (see FIG. 17).

The shower drain consists of a hollow housing 344 having a bore 346 formed therein which extends from the outside surface 348 toward the interior of the diverter sleeve where a projection 350 intercepts bore 346. A circular groove 352 is formed in bore 346 adjacent port 354 formed at surface 348 by bore 346.

A second bore 356 intercepts bore 346 in the interior of diverter sleeve 320.

A spherical ball 358 is captivated in bore 346 by an O ring 361 in groove 352 and abutment 350 formed in the interior top surface 340 of diverter sleeve 320.

The spindle 322 is provided with a flat at 360 (FIG. 16) which intersects circular groove 362. Flat 360 provides a seat for stop washer 370 (see FIGS. 20 and 21). Washer 370 is essentially an annular shape having a projection 372 extending downwardly from the lower surface 374 of washer 370. A flat 376 is formed in washer 370 diametrically opposed to the projection 372.

Stem 322 has a splined end 378 which is similar to splined end 56 of spindle 50 of the previously described valve.

Assembly of the valve of FIGS. 11–21 is essentially the same as the previous valve and is as follows:

Diverter sleeve 320 and its integral spindle 322 are filled with a ball 358 in bore 346. O ring 360 is pushed through port 354 into groove 352 to secure ball 360 in bore 346.

O ring 308 is fitted over spindle 322 and rests on surface 328 of the sleeve member 320.

Spindle 322 is now inserted in bore 296 of boss 290 until the top surface 328 of diverter sleeve 320 engages the lower interior surface of stationary port member 250. At this time, O ring 308 is captive in recess 306 of stationary port member 250.

Figure 20:
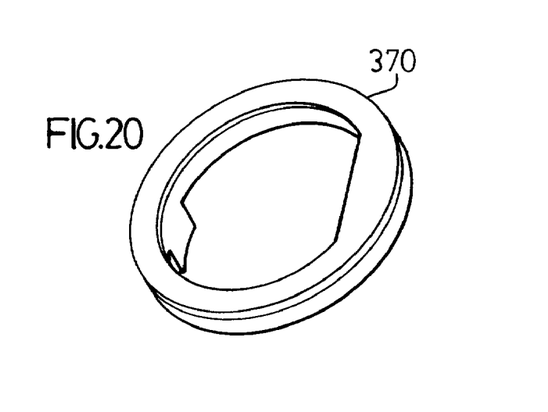
FIGS. 20 and 21 are perspective views of the stop washer of this invention.
Figure 21:
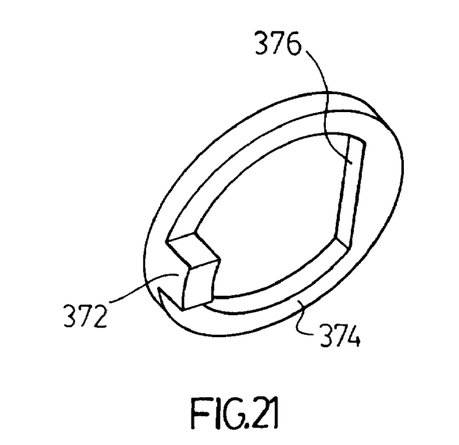

Washer 370 is now fitted to spindle 322 so that projection 372 of washer 370 drops into the arc shaped recess 300 of boss 290. Flat 376 now engages flat 360 of spindle 322 and a locking spring clip 390 is fitted to groove 362 to lock the diverter sleeve 320 and washer 370 in place in stationary port member 250. The diverter sleeve is 320 is permitted to rotate through an arc determined by recess 300 in boss 290. Projection 372 of washer 370 is received in recess 300 and the recess abutments 302 and 304 provide the necessary stops for rotation of the diverter sleeve 250.

At this time, a spherical ball 282 and spring 280 are inserted into the bore of plug 274 and the plug 274, spring 280 and ball 282 are advanced in threaded bore 272 in stationary port member 320 until head 276 of member 274 engages top surface 278 of member 320. At this time, spindle 322 may rotate the diverter sleeve 320 through an angle determined by washer 370 and recess 300 but the spring loaded ball 282 engages the dimpled depressions such as 330–336 at each operative position to provide a positive stop which indicates that the diverter sleeve is in a correct operating position. The four dimples 330–336 assure that the ports 324 and 326 are always correctly aligned with ports 252–260 of stationary port member 250 during operation of valve 200.

Next grommets, such as grommet 264, are inserted into each of the respective ports 252–260 of stationery port member 250. O ring 222 is fitted into groove 220 just below groove 224 of body 202.

Now stationary port member is inserted into the body 202 so that as lower surface 260 of stationary port member approaches surface 218 of body 202, the projection 268 of stationary port member 250 enters recess 216 formed in surface 218 of the body 202. Now ports 252–260 are in perfect alignment with outlets 206–214 and locking spring clip 226 may be fitted to groove 224 of body 202 to complete the assembly of valve 200 and seal the stationary port member 250 in the body 202.

O rings 222 and 308 are under compression and serve to seal various parts of the valve together to prevent leakage. Each operating position of rotatable sleeve 320 is clearly defined for the user by spring loaded ball 282 as it engages the dimpled depressions 330–336 in the surface 328 of the rotatable sleeve 320. The limits of rotation of rotatable sleeve member 320 are established by recess 300 in boss 290.

Figure 11:
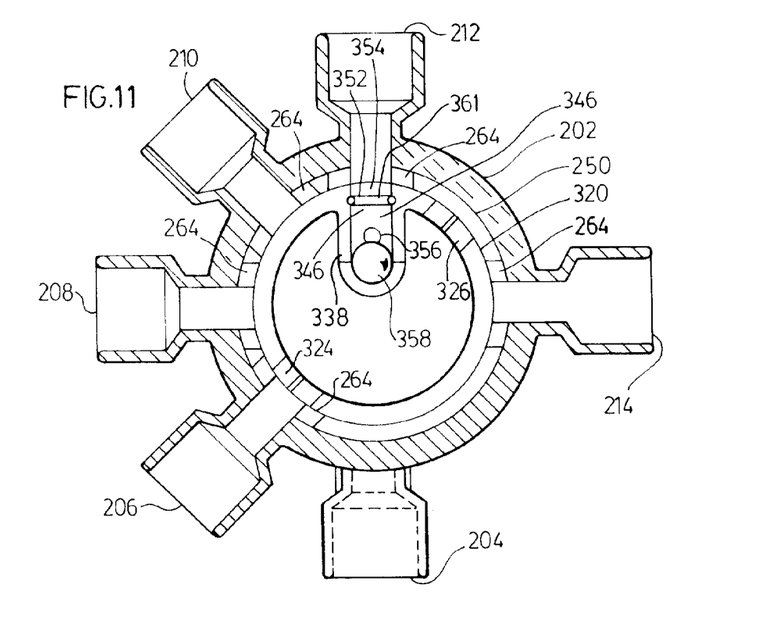
FIG. 11 is a sectional view of the valve of FIG. 10 showing the location of the various ports.

When the diverter sleeve 320 is positioned so that port 324 is to aligned with port 206 of body 200, water may pass from the interior cavity 207 of body 202 through port 324 and into outlet 206 (tub spout). At this position, the shower drain assembly 338 is in alignment with outlet 212 (shower head). Water (under pressure) will enter the inlet 204 and pass through passageway 205 of body 202 to allow water to enter the interior of rotating diverter sleeve 320. The water pressure forces ball 358 against O ring 360 to seal passageway 346 against any egress of water to the shower head. The water in the interior of rotatable diverter sleeve 320 may only exit through port 324 to tub spout 206 (and not to the shower head).

If the diverter sleeve is left in this position (spout) and the water in cavity 207 becomes depressurized, any water remaining in the plumbing connecting the shower head to the diverter valve 200 will cause ball 358 of the shower drain assembly 338 to move away from O ring 352. Ball 358 will strike abutment 350 at the end of passage 346 to permit any water stored in the plumbing leading to the shower head to be drained through passageway 346 and into port 356 to the interior of rotatable diverter sleeve 320 and out through port 324 into outlet 206 (spout) (provided the interior of the valve is not pressurized).

The valve of this invention has no seats such as found in globe or gate type valves. Any motion of valve components is between easily replaceable parts i.e. the "kit" of assembled spindle, stem and the to stationary port member. The valve body is never subjected to wear which would normally result if, say the rotatable diverter sleeve was made to mate with the surface of metallic body cavity.

Any wear between parts of the valve should occur between components which may readily be replaced; and replacement may be done by the simple removal of an escutcheon plate and a spring clip and the "kit" may be removed and replaced by a new "kit" in a reasonably straightforward manner.

It is therefore seen that the valve of this invention may be manipulated by a single control to supply a plurality of showering or washing devices, with copious amounts of water. The supply of water to any of the appliances being serviced by the valve may be restricted if desired by a simple grommet replacement.

Because the ports of the valve are of a size which is roughly equivalent to the size of the plumbing tubes leading to and from the valve, the delivery of water from the valve is substantially unthrottled.

What is claimed is:

1. A diverter valve for selectively coupling a water inlet to at least one of a plurality of water outlets by means of rotation of a rotary selector mounted within said diverter valve, said rotary selector having a port means incorporated therein and spindle means connected to said rotary selector and protruding from said diverter valve for manually rotating said port means within said diverter valve, stationary ports located in said diverter valve at predetermined spaced intervals which are selectively sealingly engaged by said port means on said rotary selector to allow water to flow from said input through said diverter valve to a selected output, wherein said port means on said rotary selector comprises more than one port, wherein said port means comprises two ports, and wherein said two ports are in communication with two stationary ports at a pre-selected position of said rotary selector.

2. A diverter valve comprising a valve body having an inlet and a series of outlets formed in said body, said body and an internal cavity having a cylindraceous surface therein, said cylindraceous surface having a series of spaced ports formed therein which are in communication with said outlets located on said body, a closure member fitted into said cavity for sealing said cavity, said closure member having a cylindrical wall in juxtaposition with said cylindraceous surface of said body, said closure member having a series of spaced ports adjacent each outlet port in said cylindraceous surface of said body, a rotatable diverter sleeve having a cylindrical wall mounted in juxtaposition with said cylindraceous surface of said closure member, said diverter sleeve having at least one diverter port in said cylindrical wall, each port in said closure member having sealing means associated therewith to provide sealed passage between said closure ports and said ports in said body and said diverter sleeve, said diverter sleeve being mounted for rotation within said closure member to sequentially align said at least one port in said diverter sleeve with said ports in said closure member to establish communication between said internal cavity and selected outputs of said body, said diverter sleeve having means for causing rotation of said diverter sleeve from outside said valve body.

3. A valve as claimed in claim 2 wherein said diverter sleeve has a flat circular surface secured to said cylindrical wall, said circular surface having a central axis which is coaxial with said cylindrical surfaces of said body and said closure member, said diverter sleeve having a series of spaced dimpled depressions in said flat surface at a constant radius from said axis.

4. A valve as claimed in claim 3 wherein said closure member houses a dimple engaging means for engaging the dimpled depressions in said flat surface.

5. A valve as claimed in claim 3 wherein said closure member houses a spring loaded ball for engagement of said dimpled depressions.

6. A valve as claimed in claim 2 wherein said diverter sleeve houses a check valve device which is rotatable with said sleeve, said check valve device having a predetermined location in said sleeve, said check valve device allowing only unidirectional water flow from an outlet port to said cavity when said cavity is depressurized.

7. A diverter valve for selectively coupling a water inlet to at least one of a plurality of water outlets by means of rotation of a rotary selector mounted within said diverter valve, said rotary selector having a port means incorporated therein and spindle means connected to said rotary selector and protruding from said diverter valve for manually rotating said port means within said diverter valve, stationary ports located in said diverter valve at predetermined spaced intervals which are selectively sealingly engaged by said port means on said rotary selector to allow water to flow from said input through said diverter valve to a selected output, wherein said port means on said rotary selector comprises more than one port, and wherein a drainage device blocks flow of water from said cavity through said drainage device when said cavity is pressurized.

8. A multi-port diverter valve having a housing incorporating a rotary selector member mounted therein for selectively connecting a water input to at least one of a plurality of water outputs on said valve, said housing comprising a valve body having a substantially cylindraceous cavity incorporated therein, said valve body having means to sealingly receive a substantially cylindrically shaped intermediate closure member in said cylindraceous cavity to close said cavity, said intermediate closure member having upstanding boss means integrally formed therein for sealingly journalling said rotary selector member about a central axis therein, said rotary selector comprising a valve spindle secured to a substantially cylindrically shaped rotatable sleeve device, said sleeve device being of such size as to be received within said closure member and slidably engage a cylindraceous surface on said closure member, said spindle of said rotary selector being journalled in said boss means so that said rotatable sleeve device and said intermediate closure member are in a cooperating co-axial relationship, said closure member being mounted in said valve housing so as to be intermediate said housing and said rotatable selector sleeve device, said intermediate closure member being provided with a plurality of ports incorporated within its structure so that each port is in communication with one of said plurality of outputs, said rotatable selector sleeve device having at least one port incorporated therein for rotation with said sleeve device within said intermediate closure member to cooperate with said ports on said closure member so as to establish a communication between said water input and a selected one of said plurality of outputs, said intermediate closure member having port sealing means mounted on said intermediate closure member to prevent leakage between said intermediate closure member and said valve body and between said intermediate closure member and said port in said rotatable sleeve.

9. A multi-port valve as claimed in claim 8 wherein said water input includes a suitable first plumbing coupling device and said water input is incorporated into said valve body in a predetermined manner to provide communication between said first plumbing coupling device and said cavity, and wherein each water output is supplied with a suitable second plumbing coupling device, and each output is in communication with a corresponding output port located at predetermined spaced intervals on a cylindrical surface in said cavity of said valve body.

10. A multi-port valve as claimed in claim 8 wherein said valve spindle and said boss on said closure member contain cooperating indexing means to cause said rotary selector member to have preferential rest positions about said axis, which correspond with the location of the ports in said closure member.

* * * * *